Feb. 24, 1953  K. R. LARSON  2,629,199
FISH LURE

Filed May 3, 1948  2 SHEETS—SHEET 1

INVENTOR.
Karl R. Larson
BY
Robert M. Dunning

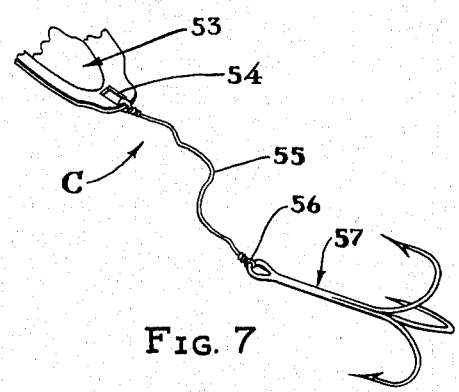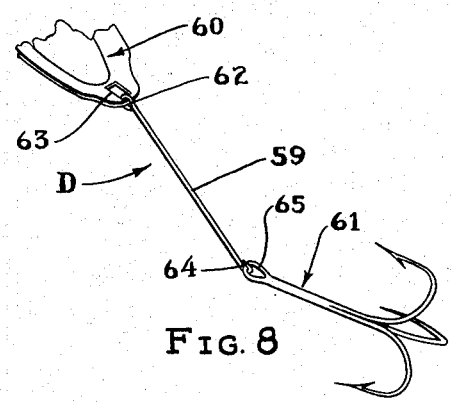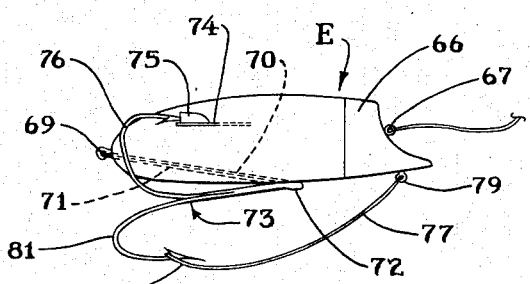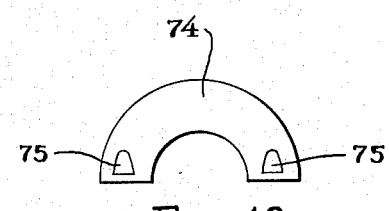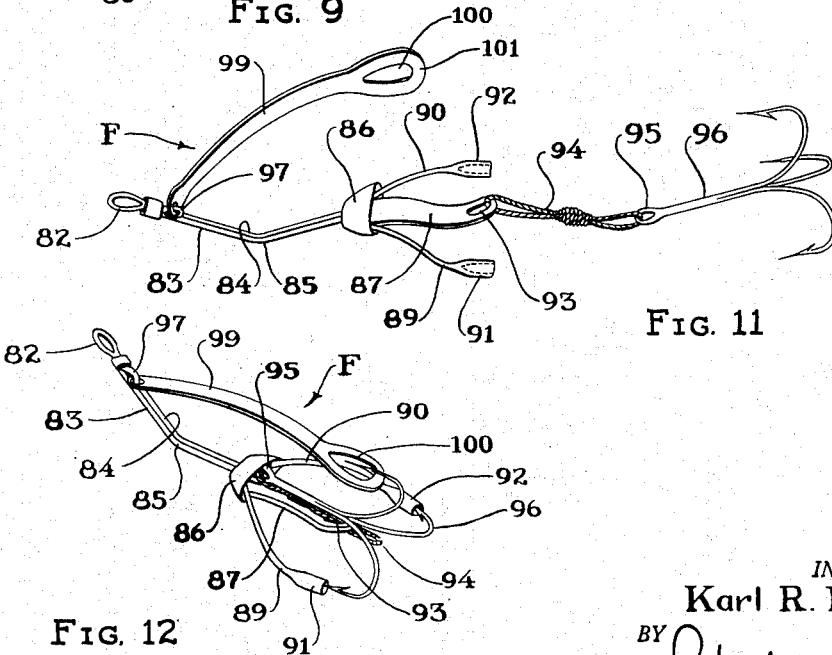

Patented Feb. 24, 1953

2,629,199

UNITED STATES PATENT OFFICE 2,629,199

FISH LURE

Karl R. Larson, Aitkin, Minn.

Application May 3, 1948, Serial No. 24,751

2 Claims. (Cl. 43—42.41)

My invention relates to an improvement in fish lure wherein it is desired to provide a weedless lure construction.

An object of the present invention lies in the provision of a guard which may be used to protect a point of a fish hook while the lure is being drawn through the water. This guard comprises a bent spring member which may be elongated by flexing the same toward a straight condition and may be engaged with the barb of a hook while thus flexed. The guard is so shaped that it will be disengaged from the barb of the hook when the lure is grasped by a fish. However, the guard protects the point of the hook as the lure is drawn through the water and prevents the hook from catching upon weeds, reeds, rocks and the like.

A feature of the present invention resides in the provision of a lure which may be used with a triple hook and still be weedless in operation. The lure is so arranged that two of the points of the triple hook are protected by portions of the lure body, while the third point of the hook is protected by the spring arm. As a result a lure having the advantages of a triple hook construction may be used in weedy places without danger of having the points of the triple hook engage the weeds.

An added feature of the present invention resides in the provision of a lure having a triple hook connected thereto by a link or a flexible connection. This link or flexible connection is usually attached to the rear end of the lure. By folding this link or flexible connection over the surface of the lure, the forward end of the triple hook may be positioned close to the forward end of the lure with two points of the triple hook engaging portions of the body of the lure. A curved spring guard attached to the forward end of the lure normally holds the hook in this position in which all of the points of the hook are guarded. However, when the spring arm connected to the barb of the third point of the triple hook is disengaged from the barb of this point, the triple hook is free to move relative to the lure and all of the points of the hook are left exposed.

A feature of the present invention lies in the fact that my structure may be adapted for use either upon a lure, or may be incorporated for use on an artificial bait of somewhat different type. Thus a plug may be equipped with my weedless hook structure and may be used in weedy waters with little danger of becoming fouled in the weeds.

These and other objects and novel features of my invention will be more clearly and fully set forth in the following specification and claims.

In the drawings forming a part of my specification:

Figure 7 is a perspective view of one end of the lure showing a flexible cable or cord connecting the hook to the lure body.

Figure 8 is a view similar to Figure 7 showing a wire link connecting the lure body and the hook.

Figure 9 is an elevation view of an artificial bait of the plug type showing the features of my invention applied thereto.

Figure 10 is a top plan view of a detail portion of the bait illustrated in Figure 9.

Figure 11 shows another modified form of lure construction showing the weed guard attached thereto.

Figure 12 is a view of the lure shown in Figure 11 with the weed guards engaging the hook thereof.

Figure 1:
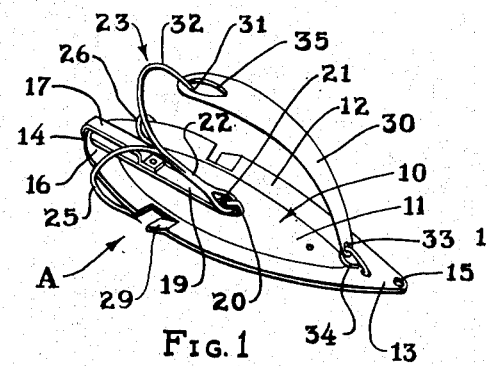
Figure 1 is a perspective view of a lure incorporating the features of my invention.
Figure 2:
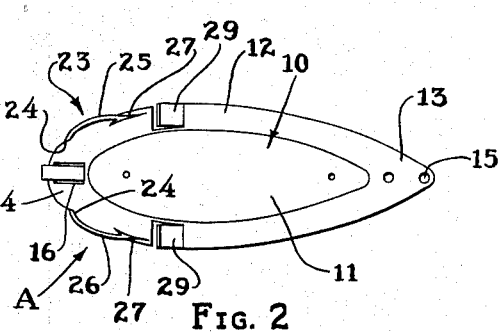
Figure 2 is a plan view of the lure shown in Figure 1.
Figure 3:
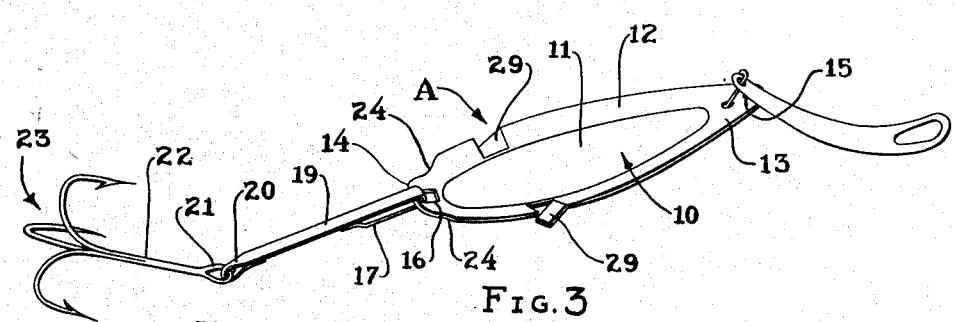
Figure 3 is a perspective view of the lure shown in Figures 1 and 2 of the drawings with the hook in unguarded position.

The lure A illustrated in Figures 1, 2, and 3 of the drawings includes an elongated concavo-convex body 10 of suitable shape. In the specific construction illustrated the lure body 10 is provided with a slightly curved elongated central body portion 11 and an encircling edge 12 surrounding the same. The edge 12 is preferably inclined relative to the center portion 11 of the body to form a concave under surface. The body is shown as having a pointed forward end 13 and a rounded rear end 14. The aperture 15 is provided in the wall 12 at the pointed forward end of the body for engagement with a suitable leader, swivel, or any suitable connection with the fishing line.

A generally rectangular aperture 16 is provided through the rear end 14 of the body for accommodating the looped end 17 of a link 19. The looped end 17 is of some length so that the link may slide somewhat relative to the lure body and be freely pivotal with respect thereto, the aperture 16 being of sufficient size to allow the link to pivot freely therein.

The link 19 is provided with a loop 20 at its other extremity, this loop 20 extending through the eye 21 on the end of the hook shank 22 of the triple hook 23.

The wall 12 is provided with a pair of opposed notches or indentations 24 on opposite sides of the rounded rear end 14. These notches 24 are properly spaced so that two of the curved shanks 25 and 26 of the triple hook 23 may engage in these notches with the shank 22 of the hook overlying the concave surface of the body with the pointed ends of the hook overlying the convex surface of the lure as indicated in Figure 2. In this figure, it will be seen that the curved hook ends extend through the notches 24 so that the pointed extremities 27 of these hooks lie against the concave surface of the wall 12. Ears 29 are bent from the body of the wall 12 forwardly of the points 27 of the hook 23 so as to protect these points from engagement with weeds, reeds, rocks and the like.

When the hook points 27 are engaged over the concave surface of the lure body, the link 19 is in position against the convex surface thereof and the shank 22 of the hook is doubled back upon this link as indicated in Figure 1. The hook is held in this position by means of the spring guard 30 which also serves to protect the pointed end 31 of the third curved hook portion 32.

The guard 30 comprises an elongated curved strip of flexible resilient material such as spring steel. An aperture 33 is provided at the forward end of this strip and a loop or link 34 connected to the forward end of the lure body is extended through this aperture 33 to loosely connect the spring to the forward end of the lure body. The spring strip 30 is likewise provided with an elongated aperture 35 near its rear extremity. The pointed end 31 of the hook 32 extends through this aperture 30 and the closed end of the spring strip engages between the barb of the point and the main body of the hook. The spring strip 30 tends to hold the hook 23 in the position illustrated in Figure 1 of the drawings, holding the link 19 against a concave surface of the body and holding the hook shank 22 doubled back upon this link. The distance between the apertures 33 and 35 of the spring strip 30 is usually less than the distance from the apertured end 33 of this strip to the crotch between the barb and the hook point 31. However, in applying the spring strip to the hook the strip 30 is flattened somewhat and thus elongated so that the spring is held in place by spring tension.

As the lure moves through the water in the condition shown in Figure 1 of the drawings, the weeds, reeds, and other material are prevented from engaging on the points of the hooks by the ears 29 of the body and by the spring strip 30. However, if a fish tends to strike the lure, the spring strip 30 is pressed toward the concave surface of the lure body and is thus disengaged from the hook point 31, whereupon the hook may pivot freely away from the lure as illustrated in Figure 3 of the drawings, exposing all of the points of the triple hook.

Figure 4:
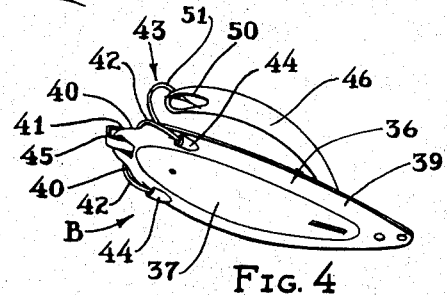
Figure 4 is a perspective view of a slightly modified form of lure construction.

In Figure 4 of the drawings I disclose a lure B which is in most respects similar to the lure A, except for minor differences. The lure body 36 is similar in general to the lure body 10 having a curved elongated center portion 37 and an inclined encircling wall 39. The outline shape of the wall 39 may be similar to that illustrated in Figures 1 and 3 of the drawings. Similarly to the lure A, the wall 39 is provided with opposed notches 40 and opposite sides of the rounded rear end 41 of the body. Two of the curved hook portions 42 of the triple hook 43 extend through these notches 40 to overlie portions of the concave surface of the wall 39. Louvers 44 are struck outwardly from the convex surface of the wall 39 which open toward the rear of the lure. The pointed ends of the curved hook portions 42 extend into the open ends of the louvers 44 and are enclosed thereby.

Figure 5:
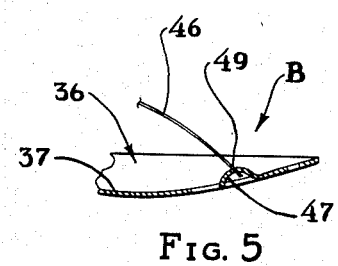
Figure 5 is a sectional view through a portion of the lure shown in Figure 4.

The hook 43 is connected to the body 36 by a link 45 similar to the link 19. A flat spring strip 46 of flexible resilient material is connected at its forward end by a tongue 47 struck outwardly from the concave surface of the body near the forward end thereof as illustrated in Figure 5 of the drawings. An aperture 49 through the forward end of the spring strip 46 pivotally connects this spring strip to the lure body.

The spring strip 46 is provided with an elongated aperture 50 which may be engaged between the barb and the point of the curved hook portion 51 as illustrated in Figure 4. The spring strip 46 is elongated in this operation, tending to hold the parts in assembled relationship.

Figure 6:
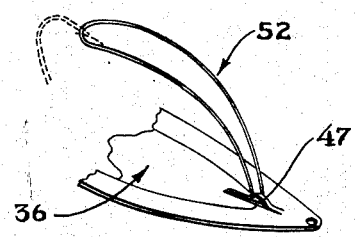
Figure 6 is a perspective view of a weed guard arm of somewhat different form from that illustrated in the previous views.

In Figure 6 of the drawings I disclose a lure body 36 identical to that illustrated in Figure 4 of the drawings and having an ear 47 struck outwardly from the concave surface of the body as previously described. A spring loop 52 of wire or similar material curved between its ends is linked to the tongue 47. This spring loop 52 may be engaged between the barb and point of a hook and serve as a guard for one of the hook points in the manner previously described.

In Figure 7 of the drawings I disclose a construction similar to that described in any of the lures of Figures 1 through 6. The lure body indicated at 53 is provided with an aperture 54 at its rear end similar to the apertures previously described. A flexible cable 55 is connected to the lure body 53 through this aperture 54. The flexible cable 55 is connected at 56 to a triple hook 57 similar to those previously described.

The operation of this lure C is identical to that previously described. The flexible cable 55 is folded to lie against the concave surface of the lure body 53 and the hook shank 57 is doubled over the cable and is engaged with the lure body and held in place in the manner previously described. In other words, the lure C is identical with the lures previously described with the exception of the fact that the flexible cable 55 is substituted for the link 19 or 45.

In Figure 8 of the drawings I disclose a lure D which is also similar to the lures previously described, with the exception of the construction of the link 59 connecting the lure body 60 to the hook 61. The link 59 is formed of wire and is provided with a loop 62 at one end which is connected to the lure body through the rear aperture 63 thereof and is provided with a linked opposite end 64 extending through the eye 65 of the hook 61. The operation of the link 59 is identical to the operation of the links 19 and 45.

In Figure 9 of the drawings I disclose the principles of my invention as applied to a plug type bait E. The bait E is provided with a body 66 which may be of wood, plastic, or other suitable material, having a screw eye 67 at its forward ends by means of which the bait may be attached to a line or leader. A screw eye 69 is likewise provided at the rear end of the body 66. A groove 70 extends into the undersurface of the lure body from the screw eye 69 to a point spaced from the forward end of the lure. The groove or slot 70 is preferably on a plane through the longitudinal axis of the lure body and is of sufficient size to accommodate the link or cable 71.

The link or cable 71 is pivotally connected at its forward end to the screw eye 69 and at its other end to the eye 72 of a triple hook 73. The plate 74 is mounted in a horizontal slot in the body 66 to project laterally from opposite sides of the body. Louvers 75 are struck upwardly from the plate 74 near opposite ends thereof. The louvers 75 accommodate the pointed ends of two curved hook portions 76 of the triple hook 73 and prevent these hook points from engaging into weeds, reeds, or other obstructions.

A curved spring strip or loop 77 is pivotally supported at 79 to the front end of the bait body and is designed to extend between the pointed end 80 of the hook portion 81 and the barb thereof. If the spring member 77 is of flat strip material, an aperture is provided at the rear end thereof through which the hook point 80 extends. Alternatively the spring 77 may comprise a wire loop which is engageable in the manner illustrated in Figure 6 of the drawings. The spring loop 77 is normally curved and must be straightened to be elongated.

The lure F illustrated in Figures 11 and 12 of the drawings differs from the previously described constructions in that the spoon shaped body of the lure is omitted in this construction. The operation of the device, however, is very similar to the operation of the devices previously described and thus similar thereto.

The lure F is provided with a loop 82 at its forward end which is formed by bending an intermediate portion of a wire rod. The bent ends 83 and 84 of the wire rod are secured to extend parallel in any suitable manner. The rods 83 and 84 are bent at 85 to extend rearwardly and terminate at a cup shaped body 86. A flat strip 87 is secured to the cup shaped receptacle 86 to extend rearwardly therefrom. A pair of outwardly diverging arms 89 and 90 are also secured to project from the rear end of the cup like body 86, these rods terminating in sockets 91 and 92 open at their rear ends.

The strip 87 is provided with an aperture 93 near its rear end which is loosely connected to a link 94 of wire cable or other suitable material. The link 94 is looped through the eye 95 of a triple hook 96. Thus the hook 96 is loosely connected to the end of the strip 87 by the link 94 which allows relative angularity between the lure body and the hook.

A loop 97 is secured to the lure body adjacent the loop 82 at the forward end of the lure. A flat strip of resilient material 99 is linked through this loop and is thus hingedly connected to the lure. The strip 99 is provided with an aperture 100 therethrough.

In one position of the hook, the strip 99, the link 94 and the hook 96 may pivot relative to the body of the lure and the hook is supported at some distance behind the lure body. However, in normal position when the lure is being used, two of the three points or prongs of the treble hook 96 are engaged in the sockets 91 and 92 and the pointed end of the third hook extends through the aperture 100 of the strip 99. The strip 99 is normally curved and is elongated by straightening out the curve. When the end 101 of the strip beyond the aperture 100 is engaged between the barb of one of the hook points and the shank of the hook, the point of the hook extends through the aperture 100 and is protected by the strip 99. The spring strip 99 also holds the hook engaged in the sockets 91 and 92, the tension of the spring tending to curve the same and therefore creating a pull upon the hook tending to draw it toward the forward end thereof. However, when a fish engages the spring strip 99, this spring strip tends to flatten out and the end 101 of the spring strip is disengaged from the barb of the hook. As a result the spring strip no longer holds the hook in place and the hook may be pulled into spaced relation with the body of the lure into the position shown in Figure 11 of the drawings.

In accordance with the patent statutes, I have described the principles of construction and operation of my fish lure, and while I have endeavored to set forth the best embodiments thereof. I desire to have it understood that obvious changes may be made within the scope of the following claims without departing from the spirit of my invention.

I claim:

1. A fish lure comprising an elongated body having a narrowing end portion, said end portion having a notch at each side thereof, a connecting member pivotally secured to said end portion and pivotable forwardly over a surface of said body, a triple hook member pivotally secured to said connecting member and pivotable rearwardly over said connecting member, two of the hooks being engageable in the notches of said end portion to thereby bring their points within the peripheral boundary of said lure, and a spring arm on said lure body engageable with the point of the third hook to hold said hook member and connecting member in overlying relationship with the surface of said lure.

2. The structure of claim 1 in which an inclined ear is disposed forwardly of each of the two hook points.

KARL R. LARSON.

REFERENCES CITED

The following references are of record in the file of this patent:

UNITED STATES PATENTS

| Number | Name | Date |
|--------|------|------|
| 808,239 | Homan | Dec. 26, 1905 |
| 813,718 | Knowles | Feb. 27, 1906 |
| 1,180,073 | Payton | Apr. 18, 1916 |
| 1,315,408 | Rabbeth | Sept. 9, 1919 |
| 2,462,437 | Tallaksen | Feb. 22, 1949 |
| 2,476,485 | Erickson | July 19, 1949 |
| 2,503,369 | Wycech | Apr. 11, 1950 |
| 2,549,463 | Hansen | Apr. 17, 1951 |